(12) United States Patent
Li et al.

(10) Patent No.: US 11,284,083 B2
(45) Date of Patent: Mar. 22, 2022

(54) METHOD AND APPARATUS FOR CODING INFORMATION ABOUT MERGE DATA

(71) Applicant: LG Electronics Inc., Seoul (KR)

(72) Inventors: Ling Li, Seoul (KR); Jaehyun Lim, Seoul (KR); Naeri Park, Seoul (KR); Junghak Nam, Seoul (KR); Hyeongmoon Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/353,137

(22) Filed: Jun. 21, 2021

(65) Prior Publication Data

US 2021/0321109 A1    Oct. 14, 2021

Related U.S. Application Data

(63) Continuation of application No. PCT/KR2019/017995, filed on Dec. 18, 2019.

(60) Provisional application No. 62/787,378, filed on Jan. 1, 2019.

(51) Int. Cl.
| | |
|---|---|
| *H04N 19/46* | (2014.01) |
| *H04N 19/132* | (2014.01) |
| *H04N 19/119* | (2014.01) |
| *H04N 19/159* | (2014.01) |
| *H04N 19/176* | (2014.01) |

(52) U.S. Cl.
CPC ......... *H04N 19/132* (2014.11); *H04N 19/119* (2014.11); *H04N 19/159* (2014.11); *H04N 19/176* (2014.11); *H04N 19/46* (2014.11)

(58) Field of Classification Search
CPC .... H04N 19/46; H04N 19/119; H04N 19/132; H04N 19/159; H04N 19/176
See application file for complete search history.

(56) References Cited

U.S. PATENT DOCUMENTS

| | | | |
|---|---|---|---|
| 11,140,391 B2* | 10/2021 | Lee | ..................... H04N 19/105 |
| 2017/0230666 A1 | 8/2017 | Tourapis et al. | |
| 2018/0241998 A1 | 8/2018 | Chen et al. | |
| 2020/0413089 A1* | 12/2020 | Liao | ..................... H04N 19/577 |
| 2021/0235072 A1* | 7/2021 | Ko | ....................... H04N 19/176 |

(Continued)

FOREIGN PATENT DOCUMENTS

| | | |
|---|---|---|
| KR | 1020150070035 | 6/2015 |
| KR | 1020180059482 | 6/2018 |
| KR | 1020180101123 | 9/2018 |

*Primary Examiner* — Tsion B Owens
(74) *Attorney, Agent, or Firm* — Fish & Richardson P.C.

(57) ABSTRACT

A video decoding method performed by a decoding apparatus according to the present disclosure comprises the steps of: receiving a bitstream including information about merge data of a current block; checking mh intra flag information for mh intra prediction which is included in the information about the merge data; checking information about a merge triangle prediction on the basis of a checking result that a value of the mh intra flag information is related to checking the information about the merge triangle prediction included in the information about the merge data; deriving prediction samples for the current block on the basis of a result of checking the information about the merge triangle prediction; and generating a reconstructed picture on the basis of the prediction samples.

20 Claims, 12 Drawing Sheets

(56) References Cited

U.S. PATENT DOCUMENTS

2021/0266602 A1\* 8/2021 Chernyak .............. H04N 19/82
2021/0297688 A1\* 9/2021 Xu ....................... H04N 19/103

\* cited by examiner

FIG. 4
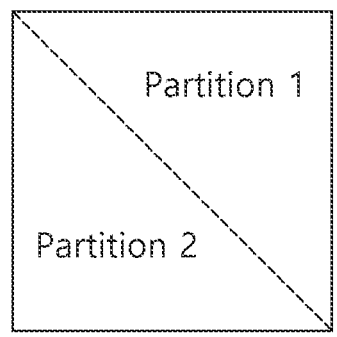 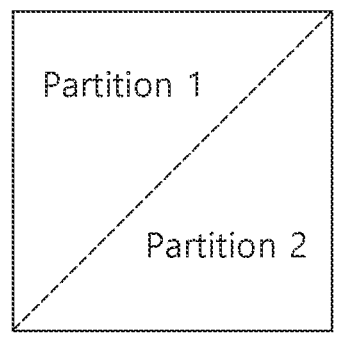

METHOD AND APPARATUS FOR CODING INFORMATION ABOUT MERGE DATA

CROSS-REFERENCE TO RELATED APPLICATIONS

Pursuant to 35 U.S.C. § 119(e), this application is a continuation of International Application PCT/KR2019/017995, with an international filing date of Dec. 18, 2019, which claims the benefit of U.S. Provisional Patent Application No. 62/787,378, filed on Jan. 1, 2019, the contents of which are hereby incorporated by reference herein in their entirety.

BACKGROUND OF THE DISCLOSURE

Field of the Disclosure

The present disclosure relates to an image coding technique, and more particularly, to a method and apparatus for coding information on merge data in an image coding system.

Related Art

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

SUMMARY

The present disclosure provides a method and apparatus for increasing image coding efficiency.

The present disclosure also provides a method and apparatus for increasing efficiency of inter prediction based on a merge mode.

The present disclosure also provides a method and apparatus for coding information on merge data, when a prediction mode of a current block is a merge mode.

The present disclosure also provides a method and apparatus for coding information on merge data based on multi-hypothesis (mh) intra flag information on mh intra prediction and information on merge triangle prediction.

The present disclosure also provides a method and apparatus for checking information on merge triangle prediction, based on a check result that a value of mh intra flag information is related to checking the information on the merge triangle prediction.

According to an embodiment of the present disclosure, there is provided an image decoding method performed by a decoding apparatus. The method includes receiving a bitstream including information on merge data of a current block, checking mh intra flag information on mh intra prediction, the mh intra flag information being included in the information on the merge data, checking information on merge triangle prediction, based on a check result that a value of the mh intra flag information is related to checking the information on the merge triangle prediction included in the information on the merge data, deriving prediction samples for the current block, based on a result of the checking of the information on the merge triangle prediction, and generating a reconstructed picture, based on the prediction samples.

According to another embodiment of the present disclosure, there is provided a decoding apparatus for performing image decoding. The decoding apparatus includes an entropy decoder which receives a bitstream including information on merge data of a current block, checks mh intra flag information on mh intra prediction, the mh intra flag information being included in the information on the merge data, and checks information on merge triangle prediction, based on a check result that a value of the mh intra flag information is related to checking the information on the merge triangle prediction included in the information on the merge data, a predictor which derives prediction samples for the current block, based on a result of the checking of the information on the merge triangle prediction, and an adder which generates a reconstructed picture, based on the prediction samples.

According to another embodiment of the present disclosure, there is provided an image encoding method performed by an encoding apparatus. The method includes deriving mh intra flag information indicating whether to apply mh intra prediction to a current block, deriving information on merge triangle prediction, based on a decision that a value of the mh intra flag information is related to deriving the information on the merge triangle prediction, and encoding information on merge data including at least one of the mh intra flag information and the information on the merge triangle prediction.

According to another embodiment of the present disclosure, there is provided an encoding apparatus for performing image encoding. The encoding apparatus includes a predictor which derives mh intra flag information indicating whether to apply mh intra prediction to a current block and derives information on merge triangle prediction, based on a decision that a value of the mh intra flag information is related to deriving the information on the merge triangle prediction, and an entropy encoder which encodes information on merge data including at least one of the mh intra flag information and the information on the merge triangle prediction.

According to another embodiment of the present disclosure, there is provided a decoder-readable storage medium storing information on instructions causing a video decoding apparatus to perform decoding methods according to some embodiments.

According to another embodiment of the present disclosure, there is provided a decoder-readable storage medium storing information on instructions causing a video decoding apparatus to perform a decoding method according to an embodiment. The decoding method according to the embodiment includes receiving a bitstream including information on merge data of a current block, checking mh intra flag information on mh intra prediction, the mh intra flag information being included in the information on the merge data, checking information on merge triangle prediction, based on a check result that a value of the mh intra flag information is related to checking the information on the merge triangle prediction included in the information on the merge data, deriving prediction samples for the current block, based on a result of the checking of the information on the merge triangle prediction, and generating a reconstructed picture, based on the prediction samples.

According to the present disclosure, overall image/video compression efficiency can be increased.

According to the present disclosure, efficiency of inter prediction based on a merge mode can be increased.

According to the present disclosure, when a prediction mode of a current block is a merge mode, information on merge data can be efficiently coded.

According to the present disclosure, information on the merge data can be efficiently coded, based on mh intra flag information on mh intra prediction and information on merge triangle prediction.

According to the present disclosure, the information on the merge triangle prediction can be checked based on a check result that a value of the mh intra flag information is related to checking the information on the merge triangle prediction.

BRIEF DESCRIPTION OF THE DRAWINGS

FIG. 4 illustrates a triangle partition method according to an embodiment.

DESCRIPTION OF EXEMPLARY EMBODIMENTS

Figure 1:
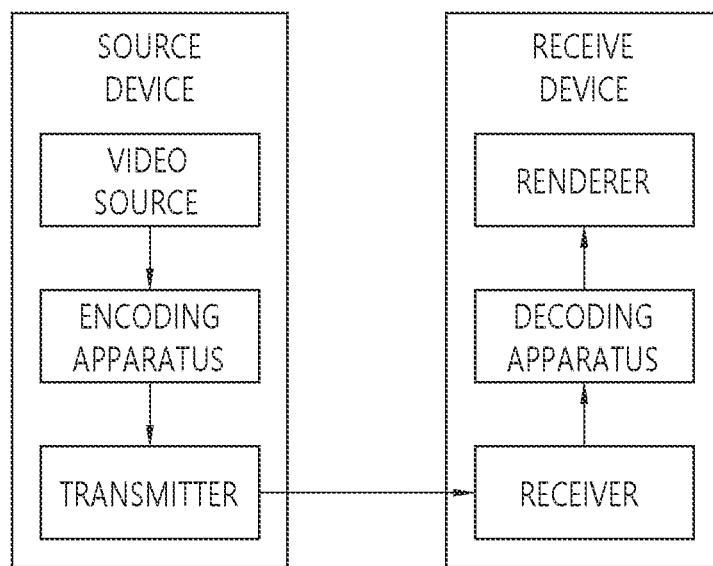
FIG. 1 illustrates an example of a video/image coding system to which the present disclosure may be applied.

According to an embodiment of the present disclosure, there is provided an image decoding method performed by a decoding apparatus. The method includes receiving a bitstream including information on merge data of a current block, checking mh intra flag information on mh intra prediction, the mh intra flag information being included in the information on the merge data, checking information on merge triangle prediction, based on a check result that a value of the mh intra flag information is related to checking the information on the merge triangle prediction included in the information on the merge data, deriving prediction samples for the current block, based on a result of the checking of the information on the merge triangle prediction, and generating a reconstructed picture, based on the prediction samples.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

Hereinafter, examples of the present embodiment will be described in detail with reference to the accompanying drawings. In addition, like reference numerals are used to indicate like elements throughout the drawings, and the same descriptions on the like elements will be omitted.

FIG. 1 illustrates an example of a video/image coding system to which the present disclosure may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

This document relates to video/image coding. For example, a method/embodiment disclosed in this document may be applied to a method disclosed in the versatile video coding (VVC) standard, the essential video coding (EVC) standard, the AOMedia Video 1 (AV1) standard, the 2nd generation of audio video coding standard (AVS2) or the next generation video/image coding standard (e.g., H.267, H.268, or the like).

This document suggests various embodiments of video/image coding, and the above embodiments may also be performed in combination with each other unless otherwise specified.

In this document, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles. A brick may represent a rectangular region of CTU rows within a tile in a picture (a brick may represent a rectangular region of CTU rows within a tile in a picture). A tile may be partitioned into a multiple bricks, each of which may be constructed with one or more CTU rows within the tile (A tile may be partitioned into multiple bricks, each of which consisting of one or more CTU rows within the tile). A tile that is not partitioned into multiple bricks may also be referred to as a brick. A brick scan may represent a specific sequential ordering of CTUs partitioning a picture, wherein the CTUs may be ordered in a CTU raster scan within a brick, and bricks within a tile may be ordered consecutively in a raster scan of the bricks of the tile, and tiles in a picture may be ordered consecutively in a raster scan of the tiles of the picture (A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture). A tile is a particular tile column and a rectangular region of CTUs within a particular tile column (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice may include an integer number of bricks of a picture, and the integer number of bricks may be included in a single NAL unit (A slice includes an integer number of bricks of a picture that may be exclusively contained in a single NAL unit). A slice may be constructed with multiple complete tiles, or may be a consecutive sequence of complete bricks of one tile (A slice may consists of either a number of complete tiles or only a consecutive sequence of complete bricks of one tile). In this document, a tile group and a slice may be used in place of each other. For example, in this document, a tile group/tile group header may be referred to as a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be usedsss interchangeably with terms such as block or area in some cases. In a general case, an MxN block may include samples (or sample arrays) or a set (or array) of transform coefficients of M columns and N rows.

In this document, the symbol"/" and "," should be interpreted as "and/or." For example, the expression "A/B" is interpreted as "A and/or B", and the expression "A, B" is interpreted as "A and/or B." Additionally, the expression "A/B/C" means "at least one of A, B, and/or C." Further, the expression "A, B, C" also means "at least one of A, B, and/or C." (In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C.")

Additionally, in the present document, the term "or" should be interpreted as "and/or." For example, the expression "A or B" may mean 1) only "A", 2) only "B", and/or 3) "both A and B." In other words, the term "or" in the present document may mean "additionally or alternatively." (Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively.")

Figure 2:
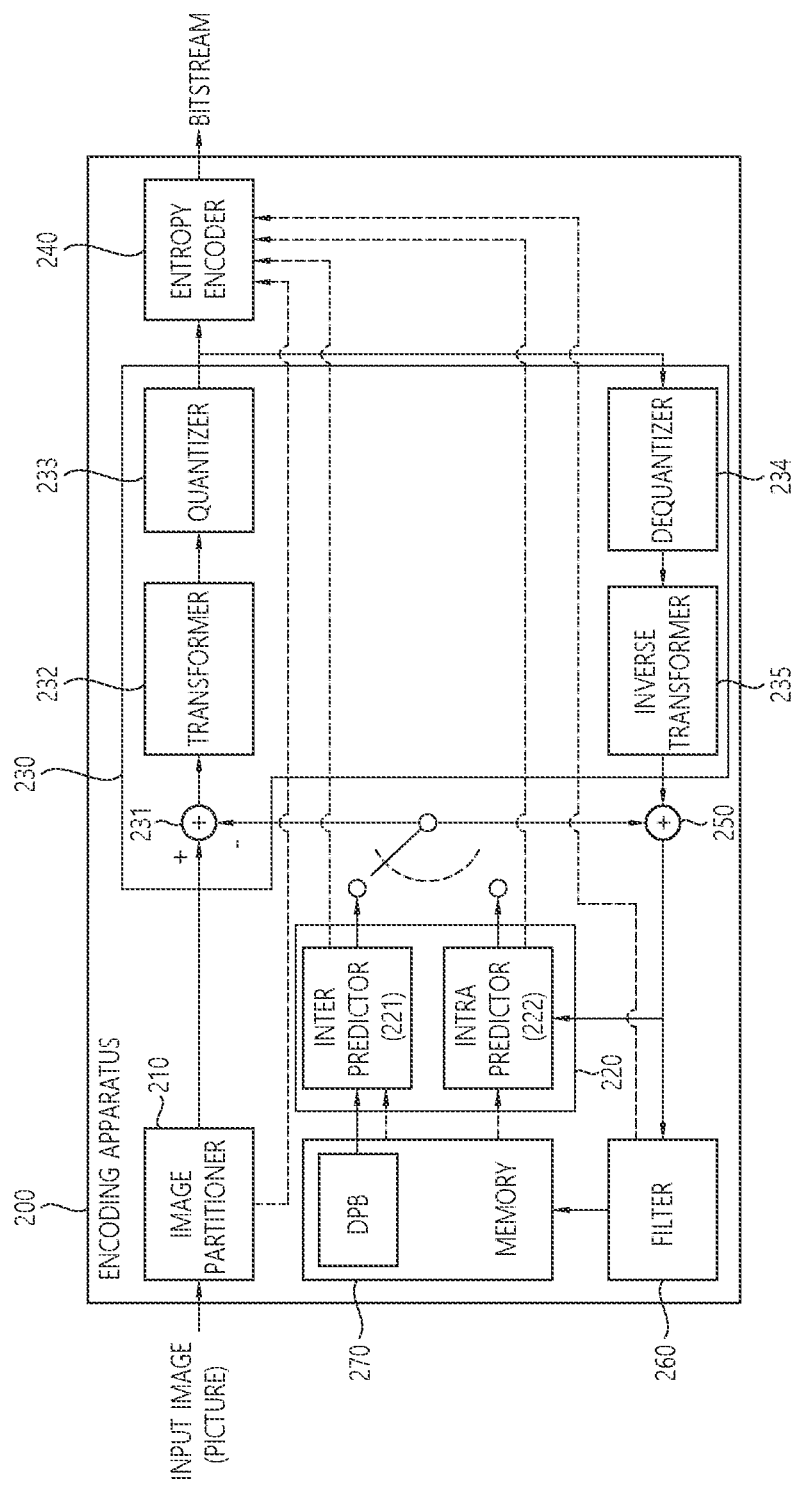
FIG. 2 is a diagram schematically illustrating a configuration of a video/image encoding apparatus to which the present disclosure may be applied.

FIG. 2 is a diagram schematically illustrating a configuration of a video/image encoding apparatus to which the present disclosure may be applied. Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (MVP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a Karhunen-Loéve transform (KLT), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in this document may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
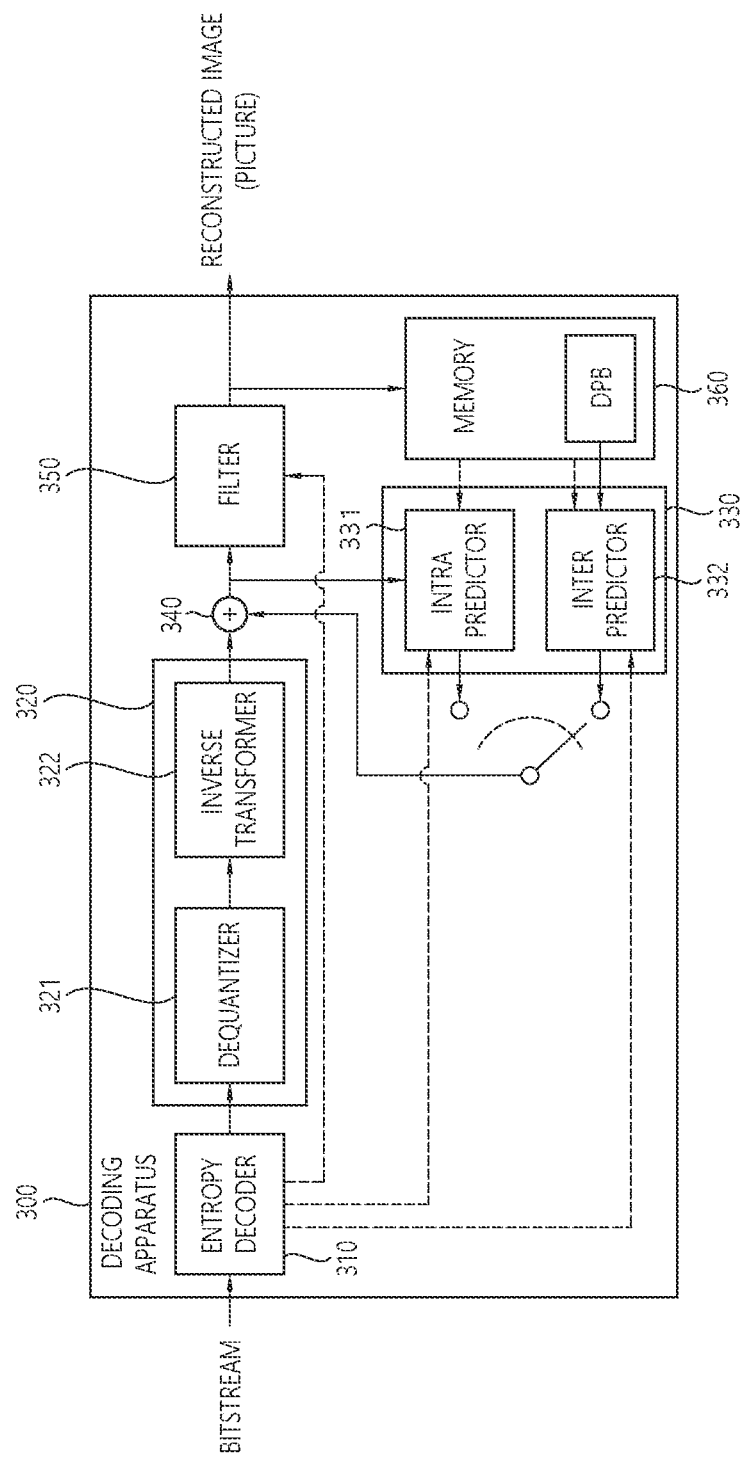
FIG. 3 is a diagram for schematically explaining a configuration of a video/image decoding apparatus to which the present disclosure is applicable.

FIG. 3 is a diagram for schematically explaining a configuration of a video/image decoding apparatus to which the present disclosure is applicable.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in this document may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to this document may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present specification, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

FIG. 4 illustrates a triangle partition method according to an embodiment.

In an embodiment, a triangle partition mode may be used for inter prediction. In an example, the triangle partition mode may be applied only to coding units (CUs) having a size greater than or equal to 8×8. The triangle partition mode may be signaled based on a flag of a CU level, as a type of a merge mode. Other merge modes may include a regular merge mode, an MMVD mode, a CIIP mode, and a sub-block mode, and examples of the merge modes are not limited thereto.

When the triangle partition mode is used according to an example, the CU may be divided into two identical triangle partitions. Each triangle partition may be inter-predicted based on motion information. Only uni-directional prediction may be allowed for each triangle partition. That is, each triangle partition may have one motion vector and one reference index.

When the triangle partition mode is used according to an example, a flag indicating a direction of the triangle partition and two merge indices may be signaled. The flag may indicate whether the triangle partition is divided based on a right-up diagonal or a left-up diagonal. A maximum candidate size of the triangle partition mode may be signaled at a slice level, and may specify syntax binarization for merge indices for the triangle partition mode. After predicting each of the triangle partitions, sample values located along a right-up diagonal or left-up diagonal edge may be adjusted.

In an embodiment, coding unit syntax information may include information on merge triangle prediction, and the information on the merge triangle prediction may include at least one of a merge triangle flag indicating whether merge triangle prediction is performed, a flag indicating a direction of the triangle partition, and a merge triangle index 0 or merge triangle index 1. In an example, the merge triangle flag may be denoted by MergeTriangleFlag or merge_triangle_flag, the flag indicating the direction of the triangle partition may be denoted by merge_triangle_split_dir, the merge triangle index 0 may be denoted by merge_triangle_idx0, and the merge triangle index 1 may be denoted by merge_triangle_idx1.

Figure 5:
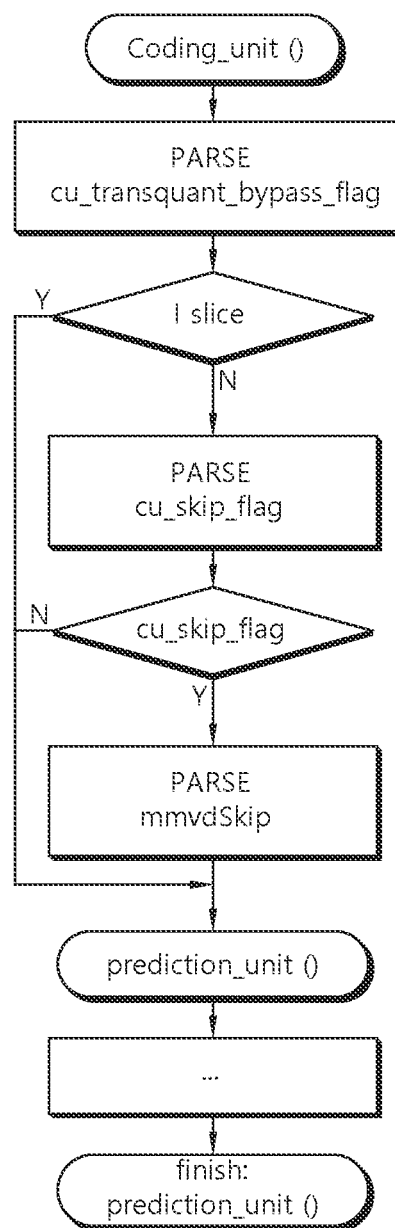
FIG. 5 is a flowchart illustrating an example of an algorithm of a coding unit syntax.
Figure 6A:
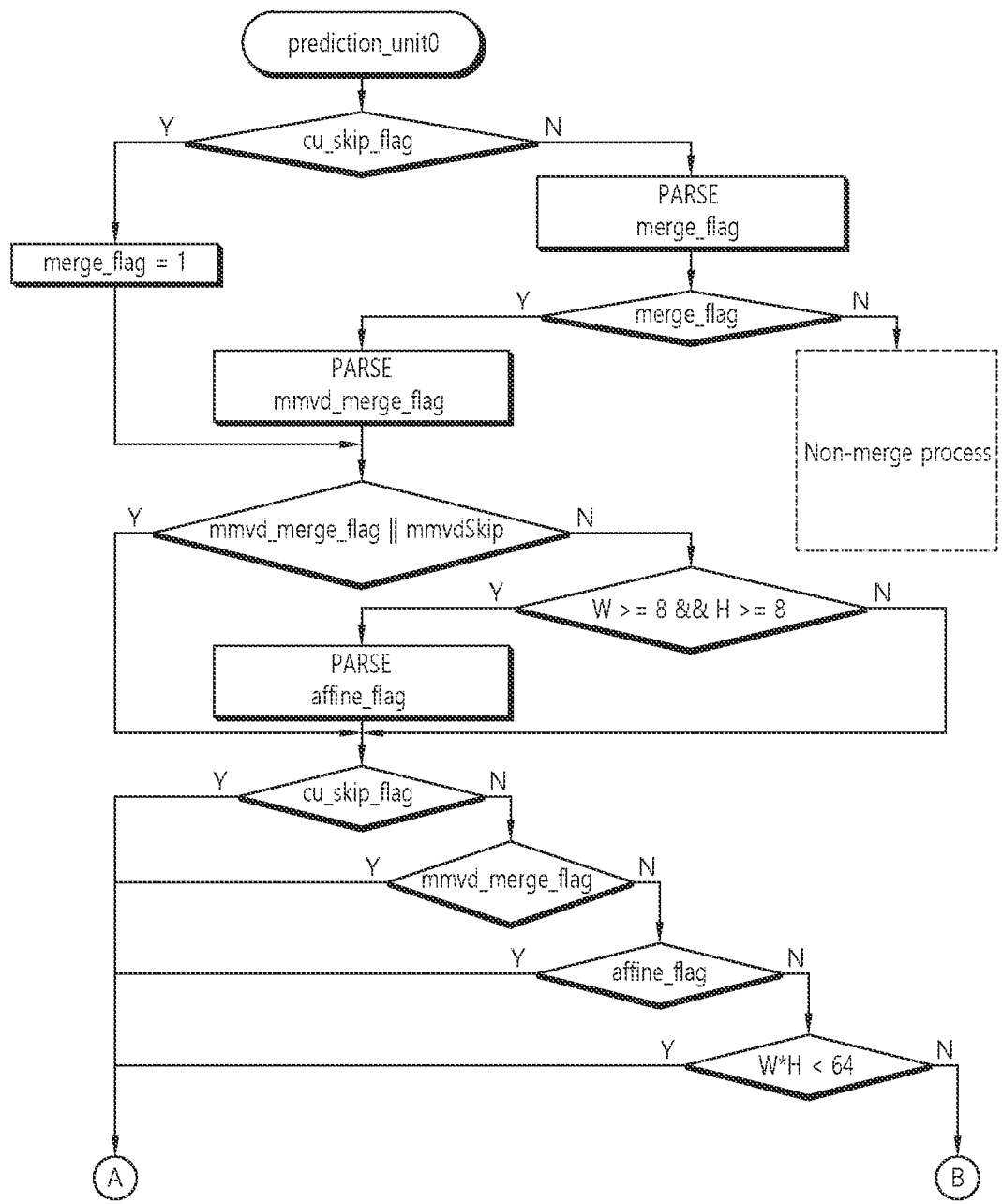
FIG. 6A and FIG. 6B are flowcharts illustrating an example of an algorithm of a prediction unit syntax.
Figure 6B:
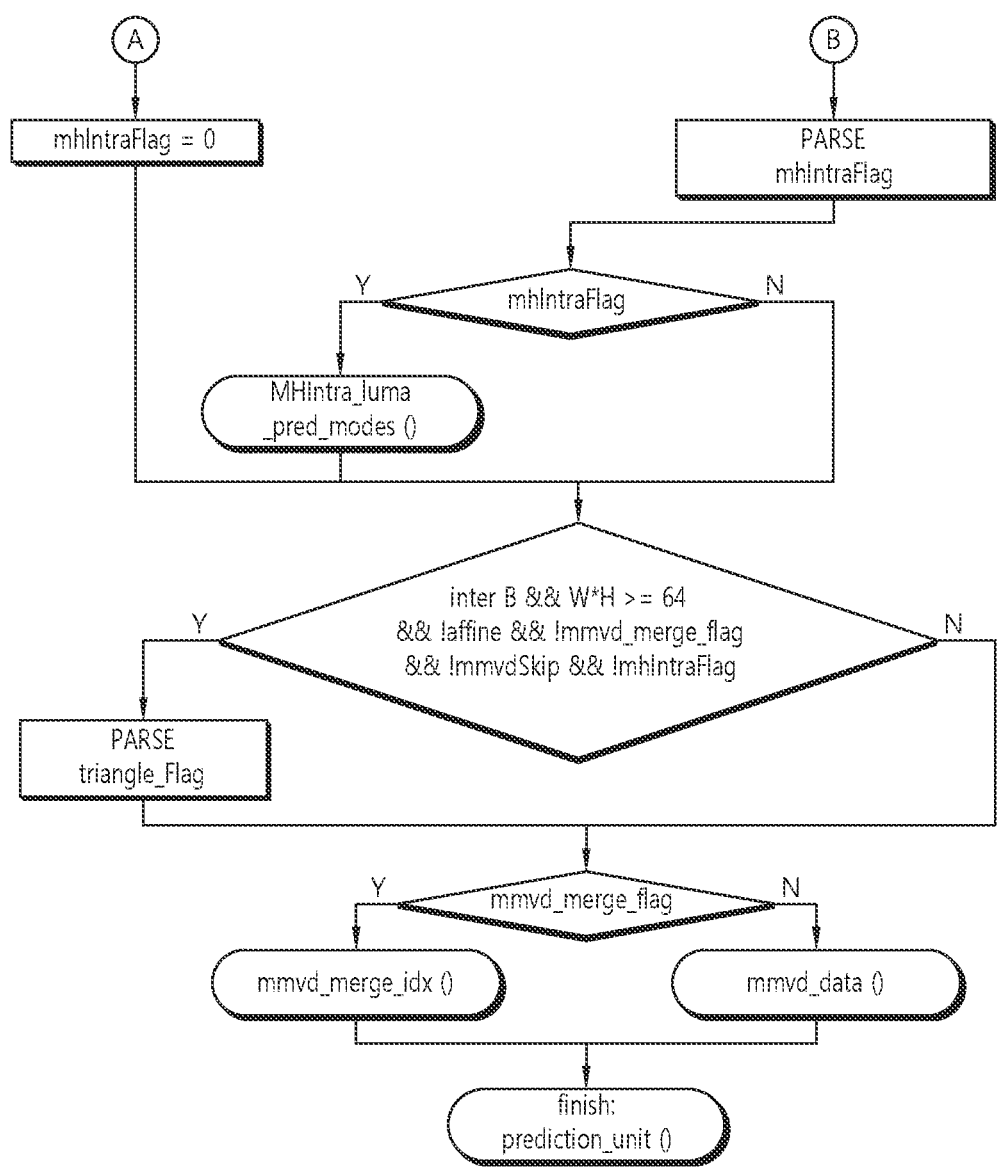

FIG. 5 is a flowchart illustrating an example of an algorithm of a coding unit syntax, and FIG. 6A and FIG. 6B are flowcharts illustrating an example of an algorithm of a prediction unit syntax.

In an embodiment, a list of inter prediction coding tools or similar inter prediction coding tools may include the following coding tools. For example, the list may include at least one of extended merge prediction, merge mode with MVD (MMVD), affine motion compensated prediction, subblock-based temporal motion vector prediction (sbTMVP), adaptive motion vector resolution (AMVR), motion field storage (1/16 luma sample motion vector storage and 8×8 motion field compression), Bi-prediction with weighted average (BWA), Bi-directional optical flow (BDOF), triangle partition prediction, and combined inter and intra prediction (CIIP).

The CIIP may be applied to a current CU. For example, when the CU is coded in the merge mode and the CU includes at least 64 luma samples (i.e., when the product of a CU width and a CU height is greater than or equal to 64), an additional flag may be signaled to indicate whether the CIIP mode is applied to the current CU.

The CIIP mode may be referred to as a multi-hypothesis (mh) mode, a mh intra prediction mode, or an intra/inter mh mode. Accordingly, the CIIP flag indicating whether to apply the CIIP mode (for the current block (CU)) may have the same/similar meaning as a mh intra flag for mh intra prediction.

In an example, the CIIP flag may be denoted by ciip_flag, and the mh intra flag may be denoted by mhIntraFlag or mh_intra_flag. The mhIntraFlag or mh_intra_flag may operate on the same/similar principle as the ciip flag, which will be easily understood by those ordinarily skilled in the art.

To construct the CIIP prediction, an intra prediction mode may first be derived from two additional syntax elements. Up to four intra prediction modes may be used, i.e., a DC mode, a planar mode, a horizontal mode, or a vertical mode. Next, inter prediction and intra prediction signals may be derived using regular intra- and inter-decoding processes. Next, weighted averaging of the inter- and intra-prediction signals may be performed to obtain the CIIP prediction.

The up to four intra prediction modes, including the DC mode, the planar mode, the horizontal mode, and the vertical mode, may be used to predict a luma component in the CIIP mode. If the CU has a very wide shape (e.g., if a width is more than twice a height), the horizontal mode may not be allowed. If the CU has a very narrow shape (e.g., the height is more than twice the width), the vertical mode may not be allowed. In these cases, only three intra prediction modes may be allowed. The CIIP mode may use three MPMs for inter prediction. A CIIP MPM candidate list may be generated based on Table 1 below.

TABLE 1

The left and top neighbouring blocks are set as A and B, respectively
The intra prediction modes of block A and block B, denoted as intraModeA and intraModeB, respectively, are derived as follows:
  Let X be either A or B
  intraModeX is set to DC if 1) block X is not available; or 2) block X is not predicted using the CIIP mode or the intra mode; 3) block B is outside of the current CTU
    otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34)
  If intraModeA and intraModeB are the same:
    If intraModeA is PLANAR or DC, then the three MPMs are set to {PLANAR, DC, VERTICAL}in that order
    Otherwise, the three MPMs are set to {intraModeA, PLANAR, DC}in that order
  Otherwise (intraModeA and intraModeB are different):
    The first two MPMs are set to {intraModeA, intraModeB}in that order TABLE 1-continued Uniqueness of PLANAR, DC and VERTICAL is checked in that order against the first two MPM candidate modes; as soon as a unique mode is found, it is added to as the third MPM If the CU has the very wide or narrow shape as defined above, a value of the MPM flag may be estimated to 1 without signaling of the MPM flag. If the CU does not have the very wide or narrow shape, the MPM flag may be signaled to indicate whether the CIIP intra prediction mode is one of the CIIP MPM candidate modes.

If the value of the MPM flag is 1, an MPM index may be additionally signaled to indicate which of the MPM candidate modes is used in CIIP intra prediction. If the value of the MPM flag is 0, the intra prediction mode may be set to a "missing" mode in the MPM candidate list. For example, if the planner mode does not exist in the MPM candidate list, the planner mode may be a missing mode, and the intra prediction mode may be set to the planar mode. Four available intra prediction modes are allowed in CIIP, and the MPM candidate list includes only three intra prediction modes. Therefore, one of the four available intra prediction modes shall be the missing mode. For chroma components, a DM mode may be applied without additional signaling. That is, chroma may use the same prediction mode as luma. The intra prediction mode of a CU coded with CIIP may be stored, and may be used in intra mode coding of future neighboring CUs.

An inter prediction signal $P_{inter}$ in the CIIP mode may be derived using the same inter prediction process applied to a regular merge mode. In addition, the intra prediction signal may be derived using a CIIP intra prediction mode conforming to a regular intra prediction process. Next, intra and inter prediction signals may be combined using a weighted average. In this case, a weight may depend on the intra prediction mode, and a sample may be located within a coding block.

If the intra prediction mode is the DC mode or the planar mode, or if the block width or height is less than 4, the same weight may be applied to intra prediction and inter prediction signals.

If the intra prediction mode is not the DC mode or the planar mode, the weight may be determined based on the intra prediction mode (in this case, the horizontal mode or the vertical mode) and a sample position in the block. A horizontal prediction mode may be taken for example (weights of the vertical mode may be similarly derived in a vertical direction). W may denote a width of the block, and H may denote a height of the block. A coding block may first be divided into four equal-area parts, and each dimension may be (W/4)×H. WT for the four areas may be respectively set to 6, 5, 3, and 2 by starting from a portion closest to the intra prediction reference samples and ending at a portion furthest from the intra prediction reference samples. A final CIIP prediction signal may be derived based on Equation 1 below.

$$P_{CIIP}=((8-wt)*P_{inter}+wt*P_{intra}+4)>>3 \quad \text{Equation 1}$$

In an embodiment, an inter-coding tool may be applied based on signaling of a flag or related information. Whether the current CU is skipped may be indicated based on cu_skip_flag. Whether the merge mode is applied to the current CU may be indicated based on merge_flag. Whether MMVD is applied to the current CU may be indicated based on mmvd_merge_flag or mmvdSkip. Whether affine prediction is applied to the current CU may be indicated based on affine_flag. Whether mh intra prediction is applied to the current CU may be indicated based on mhIntraFlag or mh_intra_flag. Whether triangle prediction is applied to the current CU may be indicated based on triangle_flag.

In an example, in order for syntax elements (e.g., cu_skip_flag, merge_flag, mmvd_merge_flag, affine_flag, etc.) (including information on inter prediction) to be sequentially parsed according to a parsing procedure and condition as shown in FIG. 5 to FIG. 6B, an encoding apparatus may configure and encode the syntax elements, and a decoding apparatus may parse/decode the syntax elements according to the parsing procedure and condition. In this case, the syntax elements may be configured sequentially in a coding unit (CU) syntax. For example, the CU syntax may be configured/encoded in the encoding apparatus so that the syntax elements are configured as shown in Table 2 and Table 3 below and then signaled/transferred to the decoding apparatus, and the decoding apparatus may derive an inter prediction mode and/or motion information or the like by parsing/decoding syntax elements according to an encoding order of the syntax elements configured in the encoding apparatus.

TABLE 2

| coding_unit( x0, y0, cbWidth, cbHeight, treeType) { | Descriptor |
|---|---|
|   if( slice_type != I){ | |
|     cu_skip_flag[x0 ][y0] | ae(v) |
|     if( cu_skip_flag[x0][y0]= =0 ) | |
|       pred_mode_flag | ae(v) |
|   } | |
|   if( CuPredMode[x0][y0] = = MODE _INTRA ) { | |
|     if( pcm_enabled_flag && | |
|       cbWidth > = MinIpcmCbSizeY && cbWidth < = MaxIpcmCbSizeY && | |
|       cbHeight > = MinIpcmCbSizeY && cbHeight < = MaxIpcmCbSizeY ) | |
|       pcm_flag[x0][y0] | ae(v) |
|     if( pcm_flag[x0][y0] ) { | |
|       while(!byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE || treeType = = DUAL_TREE_LUMA) { | |
|         if( (y0 % CtbSizeY) > 0) | |
|           intra_luma_ref_idx[x0][y0] | ae(v) |
|         if (intra_luma_ref_idx[x0][y0]= = 0) | |

TABLE 2-continued

```
          intra_luma_mpm_flag[x0][y0]                                    ae(v)
        if(intra_luma_mpm_flag[x0][y0])
          intra_luma_mpm_idx[x0][y0]                                     ae(v)
        else
          intra_luma_mpm_remainder[x0][y0]                               ae(v)
      }
      if( treeType = = SINGLE_TREE || treeType = = DUAL_TREE_CHROMA)
        intra_chroma_pred_mode[x0][y0]                                   ae(v)
      }
    } else {/* MODE_INTER */
      if( cu_skip_flag[x0][y0] = = 0)
        merge_flag[x0][y0]                                               ae(v)
      if( merge_flag[x0][y0]){
        merge_data(x0, y0, cbWidth, cbHeight )
      } else {
        if( slice_type = = B)
          inter_pred_idc[x0][y0]                                         ae(v)
        if( sps_affine_enabled_flag && cbWidth > = 16 && cbHeight > = 16)
  {
          inter_affine_flag[x0[x0][y0]                                   ae(v)
          if( sps_affine_type_flag && inter_affine_flag[x0[x0][y0])
            cu_affine_type_flag[x0[x0][y0]                               ae(v)
          }
        if( inter_pred_idc[x0[x0][y0] != PRED_L1){
          if( num_ref_idx_l0_active_minus1 > 0 )
            ref_idx_l0[x0][y0]                                           ae(v)
          mvd_coding( x0, y0, 0, 0)
          if( MotionModelIdc[x0][y0] > 0)
            mvd_coding( x0, y0, 0, 1 )
          if(MotionModelIdc[x0][y0] > 1)
            mvd_coding(x0, y0, 0, 2)
          mvp_l0_flag[x0][y0]                                            ae(v)
        } else {
          MvdL0[x0][y0][0] = 0
          MvdL0[x0][y0][1] = 0
        }
        if( inter_pred_idc[x0][y0] != PRED_L0) {
          if( num_ref_idx_l1_active_minus1 > 0 )
          ref_idx_l1[x0][y0]                                             ae(v)
          if( mvd_l1_zero_flag && inter_pred_idc[x0][y0] = = PRED_BI ) {
            MvdL1[x0][y0][0] = 0
            MvdL1[x0][y0][1] = 0
            MvdCpL1[x0][y0][0][0] = 0
            MvdCpL1[x0][y0][0][1] = 0
            MvdCpL1[x0][y0][1][0] = 0
            MvdCpL1[x0][y0][1][1] = 0
            MvdCpL1[x0][y0][2][0] = 0
            MvdCpL1[x0][y0][2][1] = 0
          } else {
            mvd_coding( x0, y0, 1, 0)
            if( MotionModelIdc[x0][y0] > 0)
              mvd_coding( x0, y0, 1, 1 )
            if(MotionModelIdc[x0][y0] > 1)
              mvd_coding( x0, y0, 1, 2)
          mvp_l1_flag[x0][y0]                                            ae(v)
          } else {
            MvdL1[x0][y0][0] =0
            MvdL1[x0][y0][0] =0
          }
        if(sps_amvr_enabled_flag && inter_affine_flag = = 0 &&
          ( MvdL0[x0][y0][0] != 0 || MvdL0[x0][y0][1] != 0 ||
          MvdL1[x0][y0][0 ] != 0 || MvdL1[x0][y0][1] != 0))
          amvr_mode[x0][y0]                                              ae(v)
          if( sps_gbi_enabled_flag && inter_pred_idc[x0][y0] = = PRED_BI
&&
          cbWidth * cbHeight > = 256)
          gbi_idx[x0][y0]                                                ae(v)
        }
      }
      if( !pcm_flag[x0][y0]) {
        if( CuPredMode[x0][y0] != MODE_INTRA && cu_skip_flag[x0][y0]
= = 0)
        cu_cbf                                                           ae(v)
          if( cu_cbf )
            transform_tree( x0, y0, cbWidth, cbHeight, treeType)
      }
    }
  merge_data( x0, y0, cbWidth, cbHeight) {                           Descriptor
    mmvd_flag[x0][y0]                                                    ae(v)
    if( mmvd_flag[x0][y0] = = 1) {
```

TABLE 2-continued

```
    mmvd_merge_flag[x0][y0]                                    ae(v)
    mmvd_distance_idx[x0][y0]                                  ae(v)
    mmvd_direction_idx[x0][y0]                                 ae(v)
  } else {
    if( MaxNumSubblockMergeCand > 0 && cbWidth > = 8 && cbHeight > = 8)
      merge_subblock_flag[x0][y0]                              ae(v)
      if( merge_subblock_flag[x0][y0] = = 1) {
        if( MaxNumSubblockMergeCand > 1 )
          merge_subblock_idx[x0][y0]                           ae(v)
      } else {
        if( sps_mh_intra_enabled_flag && cu_skip_flag[x0][y0] = =0 &&
        ( cbWidth * cbHeight) > = 64 && cbWidth < 128 && cbHeight < 128)
          mh_intra_flag[x0][y0]                                ae(v)
          if( mh_intra_flag[x0][y0 ]) {
            if ( cbWidth < = 2 * cbHeight || cbHeight < = 2 * cbWidth)
              mh_intra_luma_mpm_flag[x0][y0]                   ae(v)
            if( mh_intra_luma_mpm_flag[x0][y0])
              mh_intra_luma_mpm_idx[x0][y0]                    ae(v)
          }
        else {
          if( sps_triangle_enabled_flag && slice_type = = B &&
          cbWidth * cbHeight > = 64)
            merge_triangle_flag[x0][y0]                        ae(v)
          if( merge_triangle_flag[x0][y0])
            merge_triangle_idx[x0][y0]                         ae(v)
          else if(MaxNumMergeCand > 1)
            merge_idx[x0][y0]                                  ae(v)
        }
      }
    }
  }
}
```

TABLE 3

| | Descriptor |
|---|---|
| coding_unit( x0, y0, cbWidth, cbHeight, treeType ) { | |
|   if( slice_type != I ) { | |
|     cu_skip_flag[x0][y0] | ae(v) |
|     if( cu_skip_flag[x0][y0] = = 0 ) | |
|       pred_mode_flag | ae(v) |
|   } | |
|   if(CuPredMode[x0][y0] = = MODE_INTRA ){ | |
|     if( pcm_enabled_flag && | |
|       cbWidth > = MinIpcmCbSizeY && cbWidth < = MaxIpcmCbSizeY && | |
|       cbHeight > = MinIpcmCbSizeY && cbHeight < = MaxIpcmCbSizeY) | |
|       pcm_flag[x0][y0] | ae(v) |
|     if( pcm_flag[x][y0]) { | |
|       while(!byte_aligned( ) ) | |
|         pcm_alignment_zero_bit | f(1) |
|       pcm_sample(cbWidth, cbHeight, treeType) | |
|     } else { | |
|       if( treeType = = SINGLE_TREE || treeType = = DUAL_TREE_LUMA) { | |
|         if( (y0 % CtbSizeY ) > 0) | |
|           intra_luma_ref_idx[x0][y0] | ae(v) |
|         if (intra_luma_ref_idx[x0][y0] = = 0) | |
|           intra_luma_mpm_flag[x0][y0] | ae(v) |
|         if( intra_luma_mpm_flag[x0][y0]) | |
|           intra_luma_mpm_idx[x0][y0] | ae(v) |
|         else | |
|           intra_luma_mpm_remainder[x0][y0] | ae(v) |
|       } | |
|       if( treeType = = SINGLE_TREE || treeType = = DUAL_TREE_CHROMA ) | |
|         intra_chroma_pred_mode[x0][y0] | ae(v) |
|     } | |
|   } else {/* MODE_INTER*/ | |
|     if( cu_skip_flag[x0][y0] = = 0 ) | |
|       merge_flag[x0][y0] | ae(v) |
|     if( merge_flag[x0][y0]) { | |
|       merge_data( x0, y0, cbWidth, cbHeight ) | |
|     } else { | |
|       if( slice_type = = B) | |
|         inter_pred_idc[x0][y0] | ae(v) |
|       if( sps_affine_enabled_flag && cbWidth > = 16 && cbHeight > = 16) | |
| { | |
|         inter_affine_flag[x0][y0] | ae(v) |
|       if( sps_affine_type_flag && inter_affine_flag[x0][y0]) | |

TABLE 3-continued

| | |
|---|---|
| cu_affine_type_flag[x0][y0] | ae(v) |
|   } | |
|   if( inter_pred_idc[x0][y0] != PRED_L1 ) { | |
|     if( num_ref_idx_l0_active_minus1 > 0 ) | |
|       ref_idx_l0[x0][y0] | ae(v) |
|   mvd_coding( x0, y0, 0, 0) | |
|   if( MotionModelIdc[x0][y0] > 0) | |
|     mvd_coding( x0, y0, 0, 1 ) | |
|   if(MotionModelIdc[x0][y0] > 1) | |
|   mvd_coding( x0, y0, 0, 2 ) | |
|   mvp_l0_flag[x0][y0] | ae(v) |
|   } else { | |
|   MvdL0[x0][y0][0] = 0 | |
|   MvdL0[x0][y0][1] = 0 | |
|   } | |
|   if( inter_pred_idc[x0][y0] != PRED_L0) { | |
|   if( num_ref_idx_l1_active_minus1 > 0 ) | |
|     ref_idx_l1[x0][y0] | ae(v) |
|   if( mvd_l1_zero_flag && inter_pred_idc[x0][y0] == PRED_BI) { | |
|     MvdL1[x0][y0][0] = 0 | |
|     MvdL1[x0][y0][1] = 0 | |
|     MvdCpL1[x0][y0][0][0] = 0 | |
|     MvdCpL1[x0][y0][0][1] = 0 | |
|     MvdCpL1[x0][y0][1][0] = 0 | |
|     MvdCpL1[x0][y0][1][1] = 0 | |
|     MvdCpL1[x0][y0][2][0] = 0 | |
|     MvdCpL1[x0][y0][2][1] = 0 | |
|   } else { | |
|     mvd_coding( x0, y0, 1, 0) | |
|   if( MotionModelIdc[x0][y0] > 0) | |
|     mvd_coding( x0, y0, 1, 1 ) | |
|   if(MotionModelIdc[x0][y0] > 1) | |
|   mvd_coding( x0, y0, 1, 2) | |
|   mvp_l1_flag[x0][y0] | ae(v) |
|   } else { | |
|     MvdL1[x0][y0][0] = 0 | |
|     MvdL1[x0][y0][1] = 0 | |
|   } | |
|   if( sps_amvr_enabled_flag && inter_affine_flag == 0 && | |
|     ( MvdL0[x0][y0][0] != 0 \|\| MvdL0[x0][y0][1] != 0 \|\| | |
|     MvdL1[x0][y0][0] != 0 \|\| MvdL1[x0][y0][1] != 0 )) | |
|     amvr_mode[x0][y0] | ae(v) |
|   if( sps_gbi_enabled_flag && inter_pred_idc[x0][y0] == PRED_BI && | |
|     cbWidth * cbHeight >= 256) | |
|     gbi_idx[x0][y0] | ae(v) |
|   } | |
| } | |
| if( !pcm_flag[x0][y0]) { | |
|   if( CuPredMode[x0][y0] != MODE_INTRA && cu_skip_flag[x0][y0] == 0) | |
|     cu_cbf | ae(v) |
|   if( cu_cbf ) | |
|     transform_tree( x0, y0, cbWidth, cbHeight, treeType ) | |
|   } | |
| } | |
| merge_data( x0, y0, cbWidth, cbHeight) { | Descriptor |
|   mmvd_flag[x0][y0] | ae(v) |
|   if( mmvd_flag[x0][y0] == 1) { | |
|     mmvd_merge_flag[x0][y0] | ae(v) |
|     mmvd_distance_idx[x0][y0] | ae(v) |
|     mmvd_direction_idx[x0][y0] | ae(v) |
|   } else { | |
|   if( MaxNumSubblockMergeCand > 0 && cbWidth >= 8 && cbHeight >= 8) | |
|     merge_subblock_flag[x0][y0] | ae(v) |
|   if( merge_subblock_flag[x0][y0] == 1){ | |
|     if( MaxNumSubblockMergeCand > 1 ) | |
|       merge_subblock_idx[x0][y0] | ae(v) |
|   } else { | |
|     if( sps_mh_intra_enabled_flag && cu_skip_flag[x0][y0] == 0 && | |
|     ( cbWidth * cbHeight) >= 64 && cbWidth < 128 && cbHeight < 128) | |
|       mh_intra_flag[x0][y0] | ae(v) |
| if( mh_intra_flag[x0][y0]) { | |
|   if ( cbWidth <= 2 * cbHeight \|\| cbHeight <= 2 * cbWidth) | |
|     mh_intra_luma_mpm_flag[x0][y0] | ae(v) |
|   if( mh_intra_luma_mpm_flag[x0][y0]) | |

TABLE 3-continued

```
    mh_intra_luma_mpm_idx[x0][y0]                                ae(v)
  }
  if( sps_triangle_enabled_flag && slice_type = = B &&
cbWidth * cbHeight > = 64 && mh_intra_flag[x0][y0] = = 0)
    merge_triangle_flag[x0][y0]                                  ae(v)
  if( merge_triangle_flag[x0][y0])
    merge_triangle_idx[x0][y0]                                   ae(v)
  else if( MaxNumMergeCand > 1)
      merge_idx[x0][y0]                                          ae(v)
    }
   }
 }
}
```

Referring to Table 3, it may be confirmed that information on merge triangle prediction is checked based on a check result that a value of mh_intra_flag is related to checking the information on merge triangle prediction (e.g., at least one of merge_triangle_flag and merge_triangle_idx). More specifically, the information on the merge triangle prediction may be checked based on a check result that the value of mh_intra_lag is 0. It is described above that mh_intra_flag can be used in the same/similar principle as ciip_flag.

Figure 7:
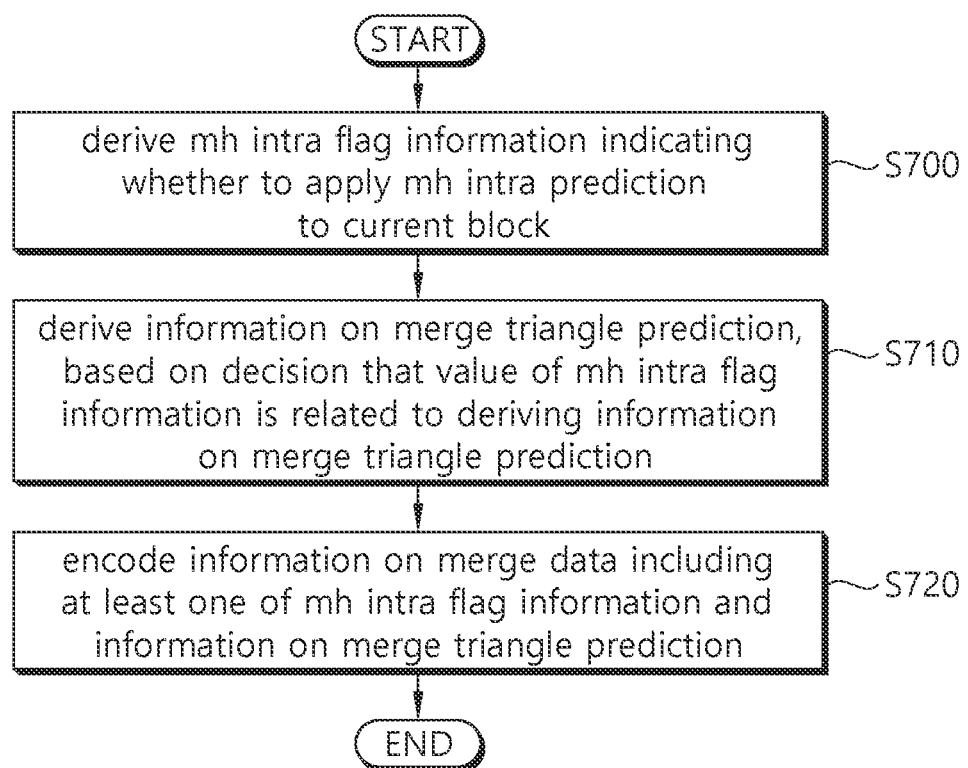
FIG. 7 is a flowchart illustrating an operation of an encoding apparatus according to an embodiment.
Figure 8:
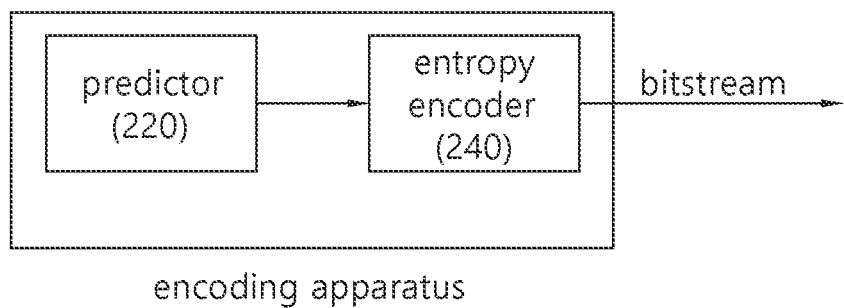
FIG. 8 is a block diagram illustrating a configuration of an encoding apparatus according to an embodiment.

FIG. 7 is a flowchart illustrating an operation of an encoding apparatus according to an embodiment, and FIG. 8 is a block diagram illustrating a configuration of an encoding apparatus according to an embodiment.

Figure 9:
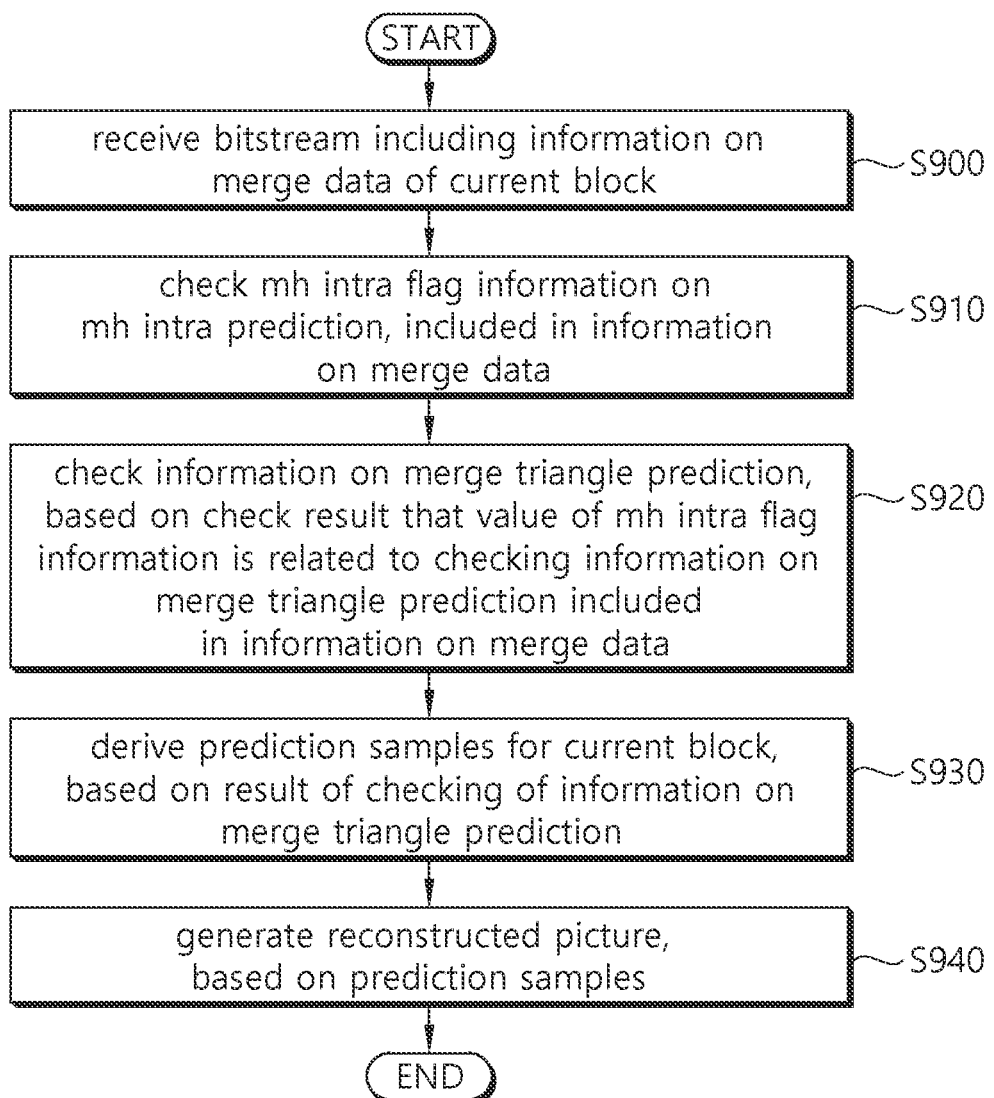
FIG. 9 is a flowchart illustrating an operation of a decoding apparatus according to an embodiment.
Figure 10:
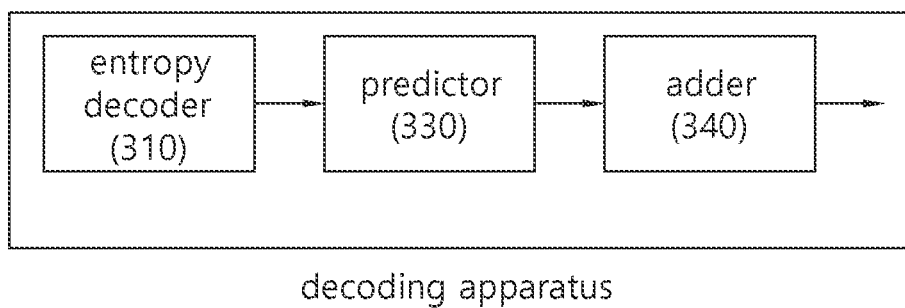
FIG. 10 is a block diagram illustrating a configuration of a decoding apparatus according to an embodiment.

The encoding apparatus according to FIG. 7 and FIG. 8 may perform operations corresponding to a decoding apparatus according to FIG. 9 and FIG. 10. Accordingly, operations of the decoding apparatus described below with reference to FIG. 9 and FIG. 10 may also be similarly applied to the encoding apparatus according to FIG. 7 and FIG. 8.

Each step disclosed in FIG. 7 may be performed by the encoding apparatus 200 of FIG. 2. More specifically, S700 and S710 may be performed by the predictor 220 of FIG. 2, and S730 may be performed by the entropy encoder 240 of FIG. 2. In addition, operations based on S700 to S720 are based on some of the descriptions mentioned above with reference to FIG. 4 to FIG. 6B. Accordingly, detailed descriptions overlapping with those described above with reference to FIG. 2 and FIG. 4 to FIG. 6B will be omitted or simplified.

As shown in FIG. 8, the encoding apparatus according to an embodiment may include a predictor 220 and an entropy encoder 240. However, optionally, not all of components shown in FIG. 8 may be essential components of the encoding apparatus, and the encoding apparatus may be implemented by more or fewer components than those shown in FIG. 8.

In the encoding apparatus according to an embodiment, the predictor 220 and the entropy encoder 240 may be implemented as separate chips, or at least two or more components may be implemented through a single chip.

The encoding apparatus according to an embodiment may derive multi-hypothesis (mh) intra flag information indicating whether to apply mh intra prediction to a current block (S700). More specifically, the predictor 220 of the encoding apparatus may derive the mh intra flag information indicating whether to apply the mh intra prediction to the current block.

The encoding apparatus according to an embodiment may derive information on merge triangle prediction, based on a decision that a value of the mh intra flag information is related to deriving the information on the merge triangle prediction (S710). More specifically, the predictor 220 of the encoding apparatus may derive the information on the merge triangle prediction, based on the decision that the value of the mh intra frag information is related to deriving the information on the merge tringle prediction.

The encoding apparatus according to an embodiment may encode information on merge data including at least one of the mh intra flag information and the information on the merge triangle prediction (S720). More specifically, the encoder 240 of the encoding apparatus may encode the information on the merge data including at least one of the mh intra flag information and the information on the merge triangle prediction.

The encoding apparatus according to an embodiment may derive coding unit information on the current block, including merge flag information indicating whether a merge mode is applied to the current block and the information on the merge data.

In an embodiment, the information on the merge data may be derived based on a decision that a value of the merge flag information is related to deriving the information on the merge data.

In an embodiment, the information on the merge triangle prediction may be derived based on a decision that a value of MMVD flag information indicating whether an MMVD is activated is 0.

In an embodiment, the information on the merge triangle prediction may be derived based on a decision that a value of MMVD merge flag information indicating whether inter prediction parameters of the current block is derived based on an MMVD is 0.

In an embodiment, it may be determined that the value of the mh intra flag information is related to deriving the information on the merge triangle prediction, based on a decision that the value of the mh intra flag information is 0.

In an embodiment, the information on the merge triangle prediction may include merge triangle index information.

In the deriving of the information on the merge triangle prediction, the decoding apparatus according to an embodiment may derive the merge triangle index information, based on a decision that the value of the mh intra flag information is related to deriving the merge triangle index information included in the information on the merge triangle prediction.

According to the encoding apparatus and method of operating the encoding apparatus of FIG. 7 and FIG. 8, the encoding apparatus may derive multi-hypothesis (mh) intra flag information indicating whether to apply mh intra prediction to a current block (S700), derive information on merge triangle prediction, based on a decision that a value of the mh intra flag information is related to deriving the information on the merge triangle prediction (S710), and encode information on merge data including at least one of the mh intra flag information and the information on the merge triangle prediction (S720). That is, according to the present disclosure, information on the merge data can be efficiently coded, based on mh intra flag information on mh intra prediction and information on merge triangle prediction. Alternatively, according to the present disclosure, the information on the merge triangle prediction can be checked based on a check result that a value of the mh intra flag information is related to checking the information on the merge triangle prediction.

FIG. 9 is a flowchart illustrating an operation of a decoding apparatus according to an embodiment, and FIG. 10 is a block diagram illustrating a configuration of a decoding apparatus according to an embodiment.

Each step disclosed in FIG. 9 may be performed by the decoding apparatus 300 of FIG. 3. More specifically, S900 and S920 may be performed by the entropy decoder 310 of FIG. 3, S930 may be performed by the predictor 330 of FIG. 3, and S940 may be performed by the adder 340 of FIG. 3. In addition, operations based on S900 to S940 are based on some of the descriptions mentioned above with reference to FIG. 4 to FIG. 6B. Accordingly, detailed descriptions overlapping with those described above with reference to FIG. 3 to FIG. 6B will be omitted or simplified.

As shown in FIG. 10, the decoding apparatus according to an embodiment may include an entropy decoder 310, a predictor 330, and an adder 340. However, optionally, not all of components shown in FIG. 10 may be essential components of the decoding apparatus, and the decoding apparatus may be implemented by more or fewer components than those shown in FIG. 10.

In the decoding apparatus according to an embodiment, the entropy decoder 310, the predictor 330, and the adder 340 may be implemented as separate chips, or at least two or more components may be implemented through a single chip.

The decoding apparatus according to an embodiment may receive a bitstream including information on merge data of a current block (S900). More specifically, the entropy decoder 310 of the decoding apparatus may receive the bitstream including the information on the merge data of the current block.

The decoding apparatus according to an embodiment may check multi-hypothesis (mh) intra flag information on mh intra prediction, the mh intra flag information being included in the information on the merge data (S910). More specifically, the entropy decoder 310 of the decoding apparatus may check the mh intra flag information on the mh intra prediction, the mh intra flag information being included in the information on the merge data. In an example, the mh intra flag information may be denoted by mh_intra_flag, ciip_flag, or mhIntraFlag.

The decoding apparatus according to an embodiment may check information on merge triangle prediction, based on a check result that a value of the mh_intra_flag information is related to checking the information on the merge triangle prediction included in the information on the merge data (S920). More specifically, the entropy decoder 310 of the decoding apparatus may check information on the merge triangle prediction, based on the check result that a value of the mh intra flag information is related to checking the information on the merge triangle prediction included in the information on the merge data.

The decoding apparatus according to an embodiment may derive prediction samples for the current block, based on a result of the checking of the information on the merge triangle prediction (S930). More specifically, the predictor 330 of the decoding apparatus may derive the prediction samples for the current block, based on the result of the checking of the information on the merge triangle prediction.

The decoding apparatus according to an embodiment may generate a reconstructed picture, based on the prediction samples (S940). More specifically, the adder 340 of the decoding apparatus may generate the reconstructed picture, based on the prediction samples.

In an embodiment, the bitstream may include coding unit information on the current block, including merge flag information indicating whether a merge mode is applied to the current block and the information on the merge data. The information on the merge data may be checked based on a check result that a value of the merge flag information is related to checking the information on the merge data.

In an embodiment, the information on the merge triangle prediction may be checked based on a decision that a value of merge mode with motion vector difference (MMVD) flag information indicating whether an MMVD is activated is 0. In an example, the MMVD flag information may be denoted by mmvd_flag or sps_mmvd_enabled_flag.

In an embodiment, the information on the merge triangle prediction may be checked based on a decision that a value of MMVD merge flag information indicating whether inter prediction parameters of the current block is derived based on an MMVD is 0. In an example, the MMVD merge flag information may be denoted by mmvd_merge_flag.

In an embodiment, the check result that the value of the mh intra flag information is related to checking the information on the merge triangle prediction may be derived based on a check result that the value of the mh intra flag information is 0.

In an embodiment, the information on the merge triangle prediction may include merge triangle index information. In an example, the merge triangle index information may be denoted by merge_triangle_idx. The merge_triangle_idx may indicate merge_triangle_idx0 or merge_triangle_idx1.

In another embodiment, the information on the merge triangle prediction may include at least one of merge triangle flag information, merge triangle partition direction information, and merge triangle index information. In an example, the merge triangle flag information may be denoted by merge_triangle_flag, the merge triangle partition direction information may be denoted by merge_triangle_split_dir, and the merge triangle index information may be denoted by merge_triangle_idx.

In the checking of the information on the merge triangle prediction, the decoding apparatus according to an embodiment may check the merge triangle index information, based on a check result that the value of the mh intra flag information is related to checking the merge triangle index information included in the information on the merge triangle prediction.

According to the decoding apparatus and method of operating the decoding apparatus of FIG. 9 and FIG. 10, the decoding apparatus may receive a bitstream including information on merge data of a current block (S900), check multi-hypothesis (mh) intra flag information on mh intra prediction, the mh intra flag information being included in the information on the merge data (S910), check information on merge triangle prediction, based on a check result that a value of the mh intra flag information is related to checking the information on the merge triangle prediction included in the information on the merge data (S920), derive prediction samples for the current block, based on a result of the checking of the information on the merge triangle prediction (S930), and generate a reconstructed picture, based on the prediction samples (S940). That is, according to the present disclosure, information on the merge data can be efficiently coded, based on mh intra flag information on mh intra prediction and information on merge triangle prediction. Alternatively, according to the present disclosure, the information on the merge triangle prediction can be checked based on a check result that a value of the mh intra flag information is related to checking the information on the merge triangle prediction.

Although the aforementioned exemplary system has been described on the basis of a flowchart in which steps or blocks are listed in sequence, the steps of the present disclosure are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments are implemented in software in the present disclosure, the aforementioned method may be implemented using a module (procedure, function, etc.) which performs the aforementioned function. The module may be stored in the memory and executed by the processor. The memory may be disposed to the processor internally or externally and connected to the processor using a variety of well-known means. The processor may include Application-specific Integrated Circuits (ASICs), other chipsets, logic circuits, and/or data processors. The memory may include Read-Only Memory (ROM), Random Access Memory (RAM), flash memory, memory cards, storage media and/or other storage devices. That is, the embodiments described herein may be implemented and performed on a processor, microprocessor, controller, or chip. For example, the functional units shown in each drawing may be implemented and performed on a computer, processor, microprocessor, controller, or chip. In this case, information for implementation (ex. information on instructions) or an algorithm may be stored in a digital storage medium.

In addition, the decoding apparatus and the encoding apparatus to which the present disclosure is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (ex. a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

In addition, the processing method to which the present disclosure is applied may be produced in the form of a program executed by a computer and may be stored in a computer-readable recording medium. Multimedia data having a data structure according to the present disclosure may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (ex. transmission over the Internet). In addition, a bitstream generated by the encoding method may be stored in the computer-readable recording medium or transmitted through a wired or wireless communication network.

In addition, an embodiment of the present disclosure may be embodied as a computer program product based on a program code, and the program code may be executed on a computer by the embodiment of the present disclosure document. The program code may be stored on a carrier readable by a computer.

Figure 11:
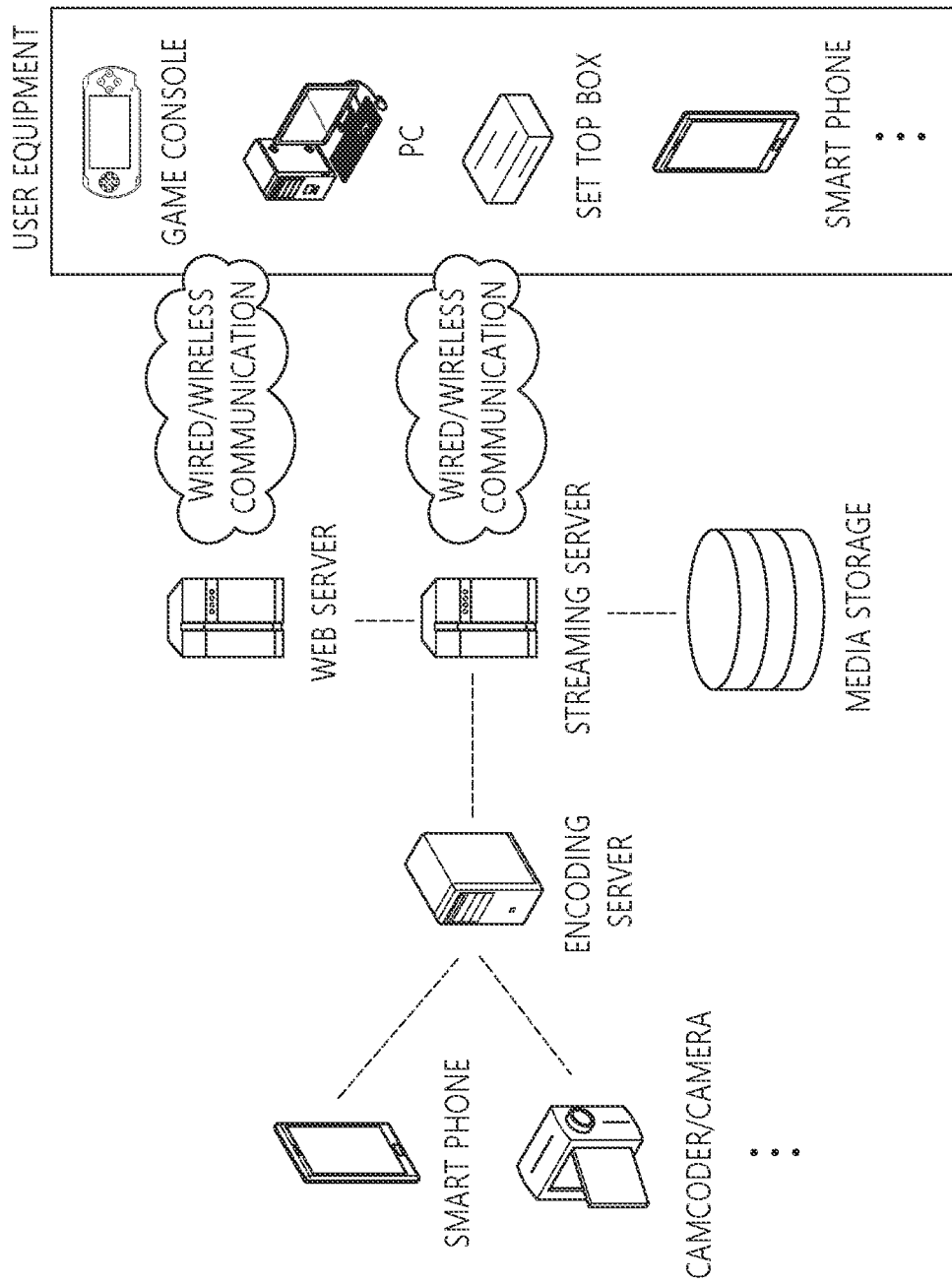
FIG. 11 represents an example of a contents streaming system to which the present disclosure may be applied.

FIG. 11 represents an example of a contents streaming system to which the present disclosure may be applied.

Referring to FIG. 11, the content streaming system to which the present disclosure is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the present disclosure is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

What is claimed is:

1. An image decoding method performed by a decoding apparatus, the method comprising:
receiving a bitstream comprising information on merge data of a current block;
deriving prediction samples for the current block based on the information on the merge data; and
generating reconstructed samples based on the prediction samples,
wherein deriving prediction samples for the current block based on the information on the merge data comprising:
checking first flag information related to whether combined inter and intra prediction (CIIP) is applied to the current block, the first flag information being included in the information on the merge data;
parsing information related to partitioning prediction, the partitioning prediction being a prediction performed by partitioning the current block, wherein the partitioning includes triangle partitioning; and
deriving the prediction samples based on the information related to the partitioning prediction,
wherein the parsing the information related to the partitioning prediction is performed based on a result of the checking of the first flag information.

2. The method of claim 1, wherein based on a result of the checking that a value of the first flag information being equal to 0, the information related to the partitioning prediction is parsed.

3. The method of claim 1, wherein based on a result of the checking that a value of the first flag information being equal to 1, the partitioning prediction is not applied to the current block.

4. The method of claim 1, wherein the CIIP and the partitioning prediction are not allowed to be applied together for the current block.

5. The method of claim 1, wherein the information related to the partitioning prediction includes at least one of a second flag information related to whether the partitioning prediction is applied to the current block or a merge index information for the partitioning prediction.

6. The method of claim 1, wherein based on a slice type of a current slice being equal to a B type, the first flag information is parsed through the information on the merge data.

7. The method of claim 1, wherein based on a value cu skip flag information for the current block being equal to 0, the first flag information is parsed through the information on the merge data.

8. The method of claim 1, wherein based on a width of the current block being less than 128 and a height of the current block being less than 128, the first flag information is parsed through the information on the merge data.

9. The method of claim 8, wherein further based on an area derived by multiplexing the width and the height of the current block being equal to or greater than 64, the first flag information is parsed through the information on the merge data.

10. The method of claim 1, wherein the information related to partitioning prediction is pared based on a case that a value of an mmvd merge flag information for the current block being equal to 0, and
wherein the mmvd merge flag information is related to whether a merge mode with a motion vector difference (MMVD) is applied to the current block.

11. An image encoding method performed by an encoding apparatus, the method comprising:
determining a prediction mode of a current block
configuring information on the merge data based on the determined prediction mode; and
encoding the information on the merge data,
wherein configuring the information on the merge data comprising:
checking first flag information related to whether combined inter and intra prediction (CIIP) is applied to the current block, the first flag information being included in the information on the merge data;
configuring information related to partitioning prediction in the information on the merge data, the partitioning prediction being a prediction performed by partitioning the current block, wherein the partitioning includes triangle partitioning;
wherein configuring the information related to the partitioning prediction in the information on the merge data is performed based on a result of the checking of the first flag information.

12. The method of claim 11, wherein based on a result of the checking that a value of the first flag information being equal to 0, the information related to the partitioning prediction is configured the information on the merge data.

13. The method of claim 11, wherein based on a result of the checking that a value of the first flag information being equal to 1, it is determined that the partitioning prediction is not applied to the current block.

14. The method of claim 11, wherein the information related to the partitioning prediction includes at least one of a second flag information related to whether the partitioning prediction is applied to the current block or a merge index information for the partitioning prediction.

15. The method of claim 11, wherein based on a slice type of a current slice being equal to a B type, the first flag information is configured in the information on the merge data.

16. The method of claim 11, wherein based on a value cu skip flag information for the current block being equal to 0, the first flag information is configured in the information on the merge data.

17. The method of claim 11, wherein based on a width of the current block being less than 128 and a height of the current block being less than 128, the first flag information is configured in the information on the merge data.

18. The method of claim 17, wherein further based on an area derived by multiplexing the width and the height of the current block being equal to or greater than 64, the first flag information is configured in the information on the merge data.

19. The method of claim 11, wherein the information related to partitioning prediction is configured in the information on the merge data based on a case that a value of an mmvd merge flag information for the current block being equal to 0, and
wherein the mmvd merge flag information is related to whether a merge mode with a motion vector difference (MMVD) is applied to the current block.

20. A computer-readable storage medium storing a bitstream causing a decoding apparatus to perform an image decoding method, the method comprising:
obtaining information on merge data of a current block through the bitstream;

determining a prediction mode of the current block based on the information on the merge data;

deriving prediction samples for the current block based on the determined prediction mode; and generating a reconstructed picture based on the prediction samples, wherein determining the prediction mode comprising:

checking first flag information related to whether combined inter and intra prediction (CIIP) is applied to the current block, the first flag information being included in the information on the merge data;

parsing information related to partitioning prediction, the partitioning prediction being a prediction performed by partitioning the current block, wherein the partitioning includes triangle partitioning;

determining the prediction mode based on the information related to the partitioning prediction, wherein the parsing the information related to the partitioning prediction is performed based on a result of the checking of the first flag information.

* * * * *